(12) United States Patent
Kotrla et al.

(10) Patent No.: US 8,509,066 B2
(45) Date of Patent: Aug. 13, 2013

(54) METHOD AND APPARATUS FOR REFLECTING FORWARDING PLATE UTILIZATION IN CONTROL PLANE

(75) Inventors: Scott R. Kotrla, Wylie, TX (US); Christopher N. DelRegno, Rowlett, TX (US); Matthew W. Turlington, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 101 days.

(21) Appl. No.: 13/171,051

(22) Filed: Jun. 28, 2011

(65) Prior Publication Data

US 2011/0255400 A1   Oct. 20, 2011

Related U.S. Application Data

(63) Continuation of application No. 12/260,116, filed on Oct. 29, 2008, now Pat. No. 7,990,856.

(51) Int. Cl.
*H04J 1/16* (2006.01)

(52) U.S. Cl.
USPC ........................................................ 370/229

(58) Field of Classification Search
USPC ............. 370/229, 241, 241.1, 338, 333, 334, 370/252, 400, 401, 231, 232, 236.2, 351; 709/223, 224; 702/177; 379/265.06, 265.08
See application file for complete search history.

(56) References Cited

U.S. PATENT DOCUMENTS

| | | | |
|---|---|---|---|
| 5,991,268 A | 11/1999 | Awdeh et al. | |
| 6,697,373 B1 | 2/2004 | Sandstrom | |
| 6,791,941 B1 | 9/2004 | Dziong et al. | |
| 6,920,112 B1 * | 7/2005 | McCloghrie et al. | 370/252 |
| 7,092,356 B2 * | 8/2006 | Rabie et al. | 370/230 |
| 7,630,358 B1 * | 12/2009 | Lakhani et al. | 370/351 |
| 2008/0019375 A1 | 1/2008 | Charzinski et al. | |
| 2008/0049614 A1 | 2/2008 | Briscoe et al. | |
| 2008/0247314 A1 | 10/2008 | Kim et al. | |

FOREIGN PATENT DOCUMENTS

EP   1300995   4/2003

OTHER PUBLICATIONS

Cheng, et al., "The Notion of overbooking and Its Application to IP/MPLS Traffic Engineering; draft-cchen-te-overbooking-00.txt", Jan. 17, 2000.

Michael, et al., "QRP05-2: Time-Exponentially Weighted Moving Histograms (TEWMH) for Application in Adaptive Systems", Global Telecommunications Conference, 2006. Globecom '06. IEEE, IEEE, PI, Nov. 1, 2006, pp. 1-6.

* cited by examiner

*Primary Examiner* — Chi Pham
*Assistant Examiner* — Alexander O Boakye

(57) ABSTRACT

A method is provided that includes setting a first oversubscription factor of a control plane for an interface, measuring forwarding plane utilization on the interface, and calculating a second oversubscription factor of the control plane for the interface using the measured forwarding plane utilization as compared with a target forwarding plane utilization on the interface. The method also includes determining whether to update the first oversubscription factor based upon the calculated second oversubscription factor.

17 Claims, 7 Drawing Sheets

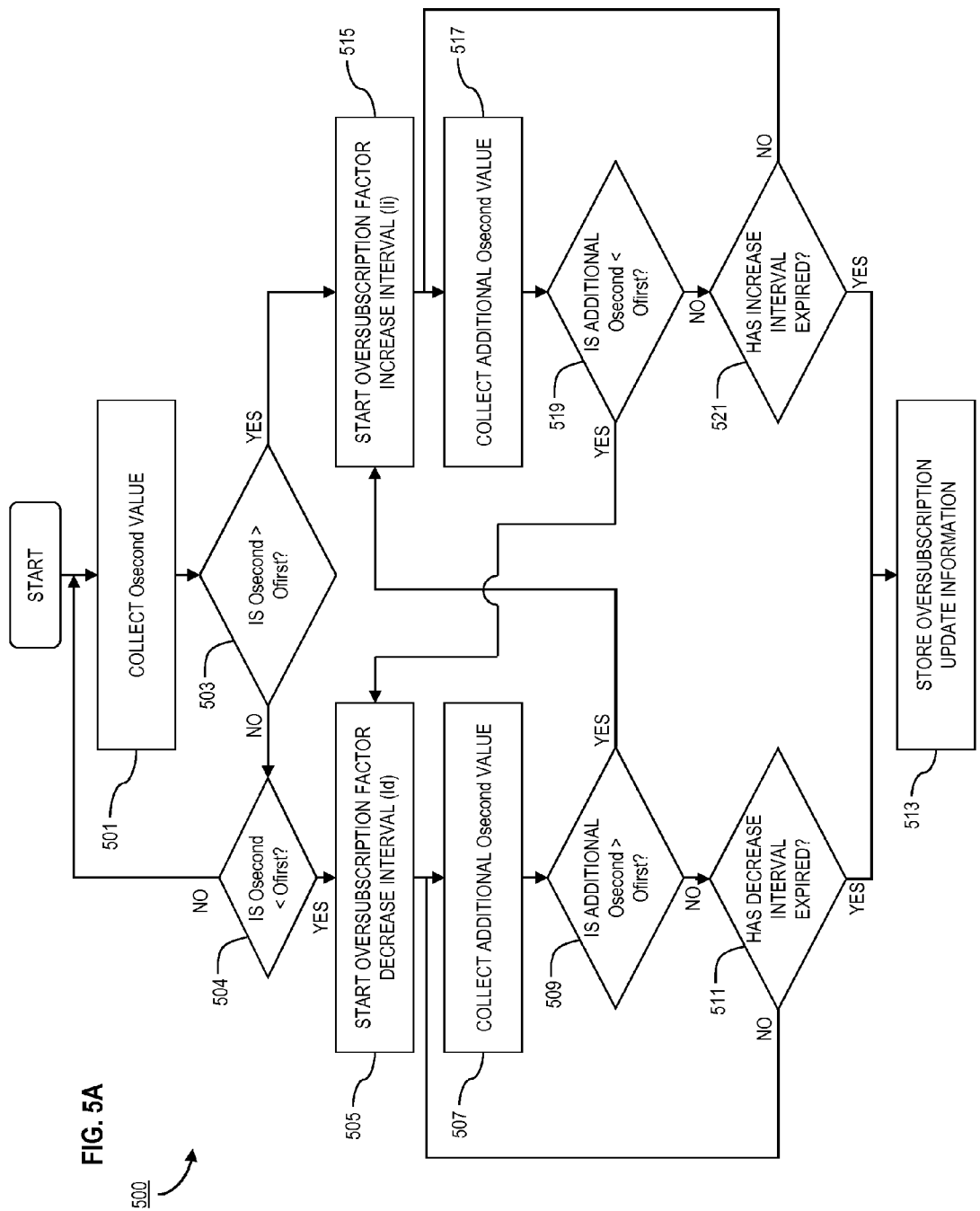

ially, in the figures of the
METHOD AND APPARATUS FOR REFLECTING FORWARDING PLATE UTILIZATION IN CONTROL PLANE

RELATED APPLICATION

This application is a continuation of U.S. patent application Ser. No. 12/260,116, filed Oct. 29, 2008, now U.S. Pat. No. 7,990,856, the entirety of which is incorporated herein by reference.

BACKGROUND INFORMATION

Modern communication networks are growing in size and complexity. As the number of consumers increases and services evolve in sophistication, the performance of these networks can degrade, in part, from link and pathway congestion. During information transport, link and pathway congestion customarily results in transmitted units of data (e.g., blocks, cells, frames, packets, etc.) becoming unevenly distributed over time, excessively queued, and discarded, thereby degrading the quality of network communications. Network devices, such as routers, play a key role in the rapid and successful transport of such information. One approach to ensuring quality is to deploy routers with more processing power and capacity; unfortunately, this approach can be cost prohibitive. Therefore, the concept of logical routers has been developed to permit the sharing of expensive hardware components. However, these logical routers, which behave independently, lack coordination with respect to the allocation of resources. Another factor contributing to cost is the development of new protocols and standards to accommodate new functionalities.

Therefore, there is a need for an approach that provides for efficient link sharing among logical routers, while attempting to preserve compatibility with current protocols and standards.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 5A is a flowchart of a process for determining whether a change in the oversubscription factor over an oversubscription decrease interval or over an oversubscription factor increase interval warrants consideration for an update in the oversubscription factor, according to an exemplary embodiment;

DESCRIPTION OF THE PREFERRED EMBODIMENT

A preferred apparatus, method, and system for reflecting forwarding plane utilization in control plane are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

An approach is provided of reflecting forwarding plane utilization in a dynamic control plane with bandwidth reservation by sampling forwarding plane utilization and changing advertised control plane bandwidths by changing the oversubscription factor on an interface used for Call Admission Control (CAC) in real time to compensate for differences in expected and measured forwarding plane utilization, which can also be applied to solving bandwidth reservation problems with ships-in-the-night routing.

Although various exemplary embodiments are described with respect to a Multiprotocol Label Switching (MPLS) network, it is contemplated that these embodiments have applicability to any communication system capable of supporting bandwidth reservation.

Figure 1:
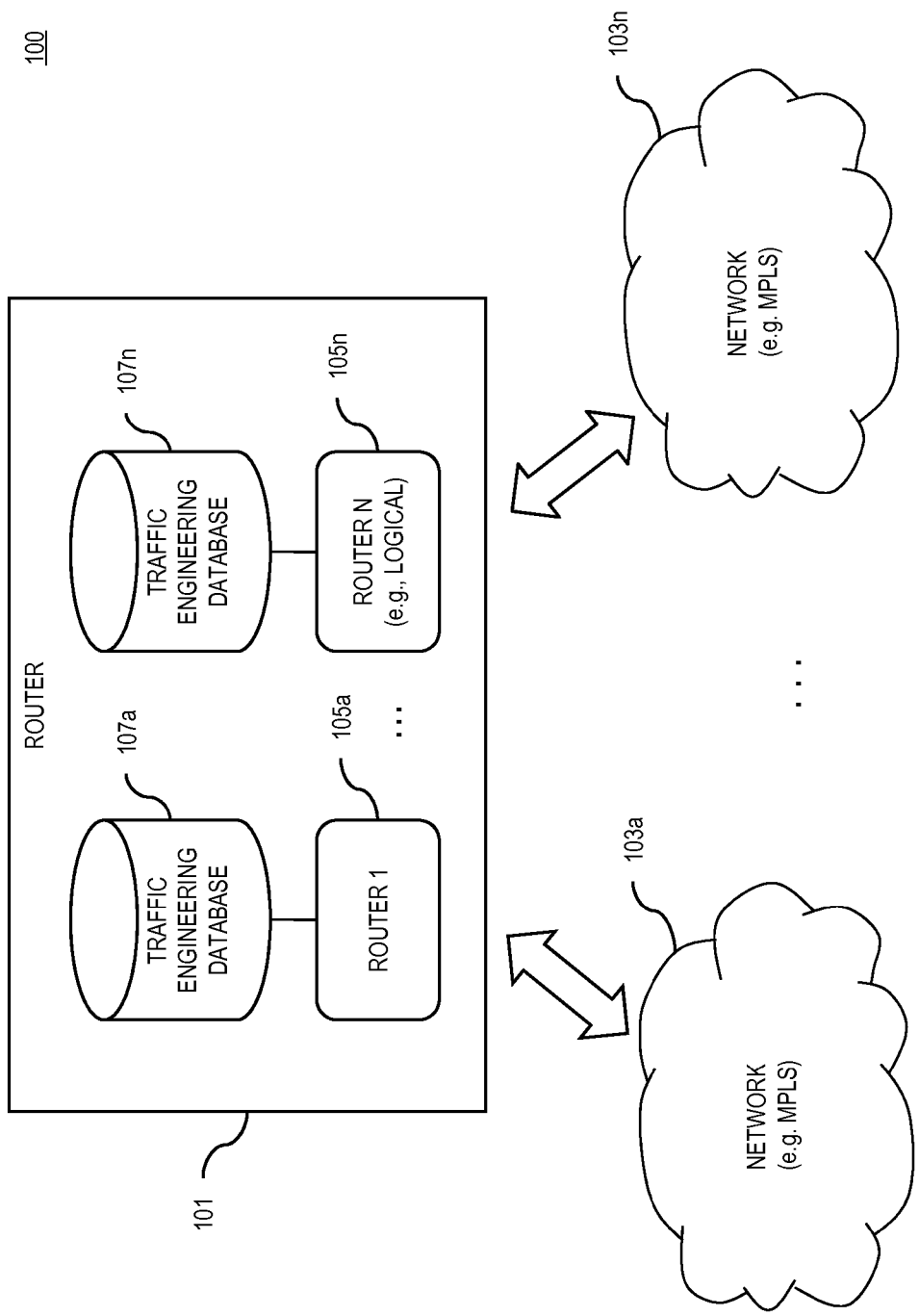
FIG. 1 is a diagram of a system capable of providing link sharing among logical routers.
Figure 2:
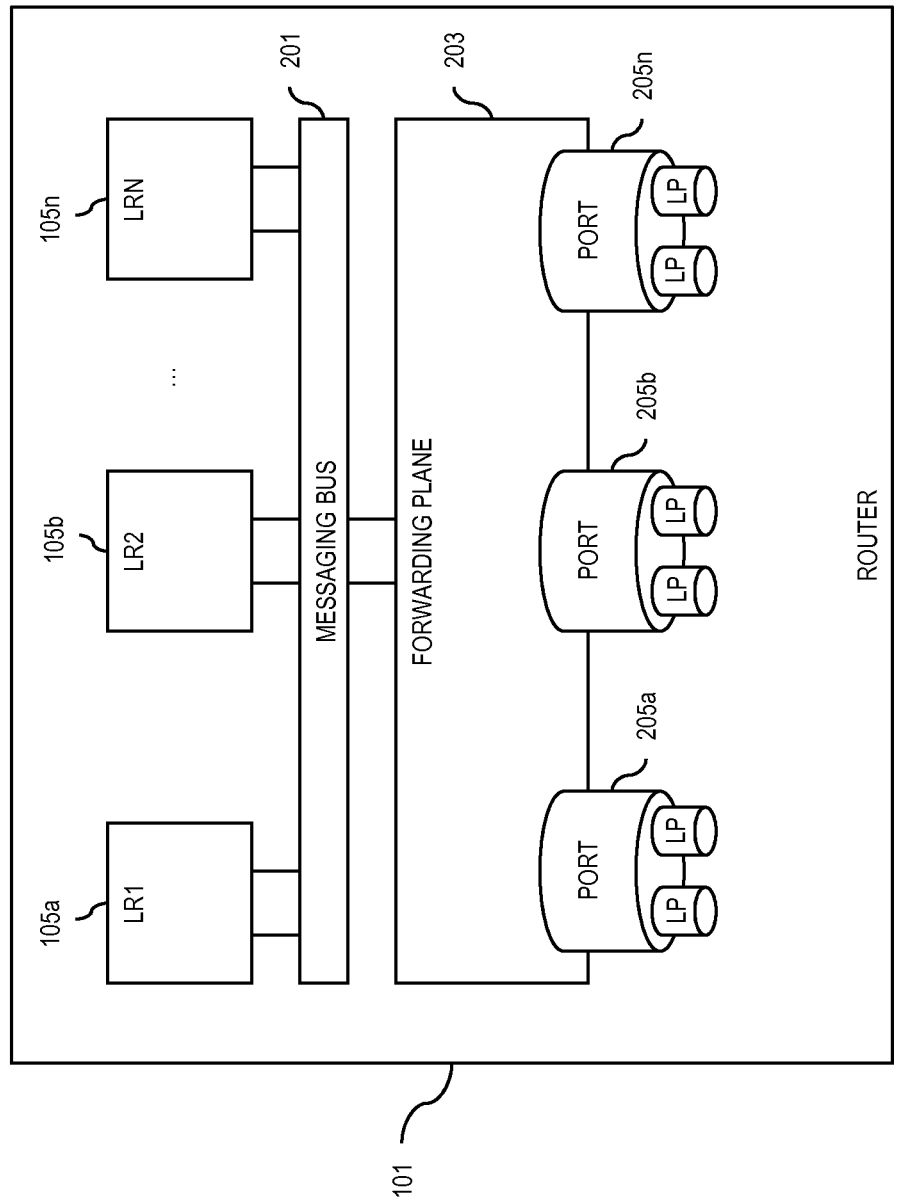
FIG. 2 is a diagram of a physical router implementing multiple logical routers, according to various exemplary embodiments.

FIGS. 1 and 2 are, respectively, a diagram of a system capable of providing link sharing among logical routers, and a diagram of a physical router implementing multiple logical routers, according to various exemplary embodiments. A communication system 100 includes a networking device 101, such as a router (or routing platform) that provides connectivity between the one or more networks 103a-103n. The router 101 comprises one or more physical and/or logical routers 105a-105n with corresponding traffic engineering databases 107a-107n. Assuming routers 105a-105n encompass logical routers, such logical routers may be Software Logical Routers (SLRs) or Hardware Logical Routers (HLRs). The logical routers (e.g., router 105n) in a sense are similar to physical routers in that they possess their own set of hardware and software resources (e.g., processors, line cards, configuration, interfaces, and protocols). By way of example, the networks 103a-103n can be Multi Protocol Label Switching (MPLS) networks. MPLS provides for efficient transport of traffic flows between different hardware platforms as well as different applications. Traffic engineering, within an MPLS network, is provided through the use of label switched paths (LSPs), which are created independently based on user-defined policies.

Data transmission over an MPLS system involves the establishment of label-switched paths (LSPs), which are a sequence of labels stemming from every node within the communication path from a source node to a destination node. Resource Reservation Protocol (RSVP) or label distribution protocol (LDP) can be used to distribute the labels. With respect to an Internet Protocol (IP)-based network MPLS can map IP addresses to fixed-length labels for processing by packet-forwarding or packet-switching platforms. MPLS, which is independent of Layer 2 and Layer 3 protocols, can support a variety of protocols. Accordingly, these networks 103a-103n may further utilize network elements employing a host of technologies, including Gigabit Ethernet, frame relay, Asynchronous Transfer Mode (ATM), Fiber Distributed Data Interface (FDDI), synchronous optical network (SONET), etc.

Figure 6:
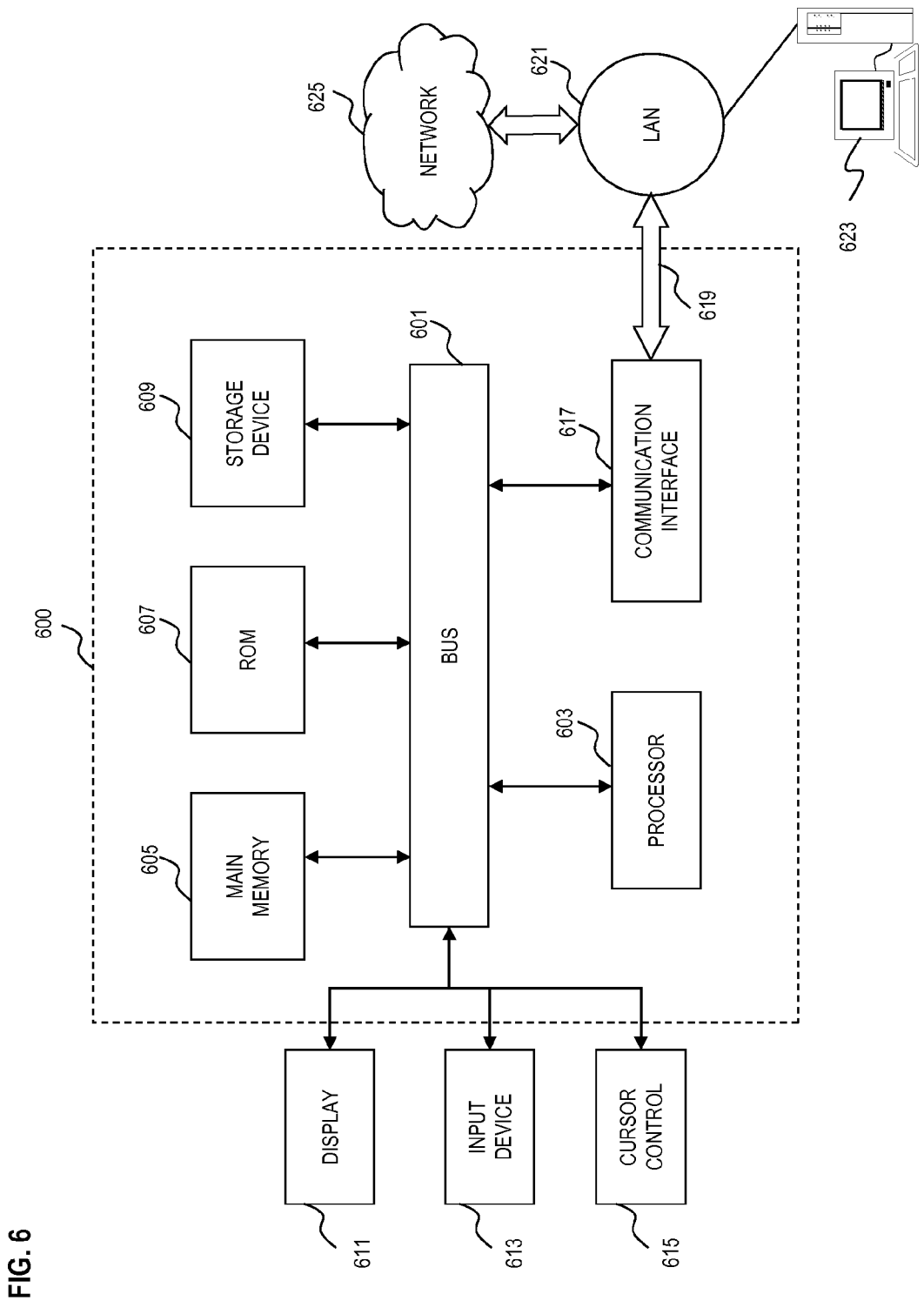
FIG. 6 is a diagram of a computer system that can be used to implement various exemplary embodiments.

The router 101 operates at the physical layer, link layer and network layer of the Open Systems Interconnection (OSI) model to transport data across the network 100. In general, the router 101 can determine the "best" paths or routes by utilizing various routing protocols. Routing tables are maintained by each router for mapping input ports to output ports using information from routing protocols. Exemplary routing protocols include Border Gateway Protocol (BGP), Interior Gateway Routing Protocol (IGRP), Routing Information Protocol (RIP), Open Shortest Path First (OSPF), and Intermediate System to Intermediate System (IS-IS). In addition to intelligently forwarding data, the router 101 can provide various other functions, such as firewalling, encryption, etc. It is noted that the label distribution can also involve piggybacking on the BGP or OSPF routing protocols. The router functions can be performed using a general purpose computer (e.g., as shown in FIG. 6), or be highly specialized hardware platform with greater processing capability to process high volumes of data and hardware redundancies to ensure high reliability. The logical routers 105a-105n can work independently with any of the above internetworking protocols.

As seen in FIG. 2, the router 101 includes a messaging bus 201 for permitting the exchange of messages between the logical routers 105a-105n and a shared forwarding plane 203. A forwarding plane 203 couples to one or more ports 205a-205n to process packets received over these ports 205a-205n by determining addressing information for destination nodes or devices. Additionally, these ports 205a-205n can provide multiple logical ports (LPs). The forwarding plane 203 uses a forwarding table to determine a communication path to the destination node. The forwarding table entries are populated by the forwarding information base entries received from the plurality of logical routers based on the routing tables contained therein. In typical hardware logical router implementations, hardware resources are dedicated to each logical router. Hardware separated logical routers could also share logical interfaces as well. However, in some software logical router implementations, no such dedication of physical resources to each logical router is required. As such, separate logical routers can share the same physical network port, with separation occurring at Layer 2 via Ethernet VLANs (virtual local area networks), ATM VCCs (Asynchronous Transfer Mode Virtual Channel Connections), Frame Relay DLCIs (data link connections), etc. However, since the separation is at Layer 2, traffic engineering becomes more complicated since each Layer 2 logical channel could utilize the entire capacity of the port (e.g., port 205a). In situations where each logical router is forwarding large volumes of traffic across their individual logical port, congestion and packet loss can occur. As MPLS traffic engineering has no mechanism for representing congestion and packet loss in the traffic engineering information distributed to the network, traditionally each logical router would have no knowledge regarding whether the sum of all of the logical routers' bandwidth reservations could exceed the port capacity.

To address this issue, the router 101, according to one embodiment, provides a mechanism for reflecting forwarding plane utilization in a dynamic control plane with bandwidth reservation by sampling forwarding plane utilization and changing advertised control plane bandwidths by changing the oversubscription factor on an interface used for CAC in real time to compensate for differences in expected and measured forwarding plane utilization.

Figure 3:
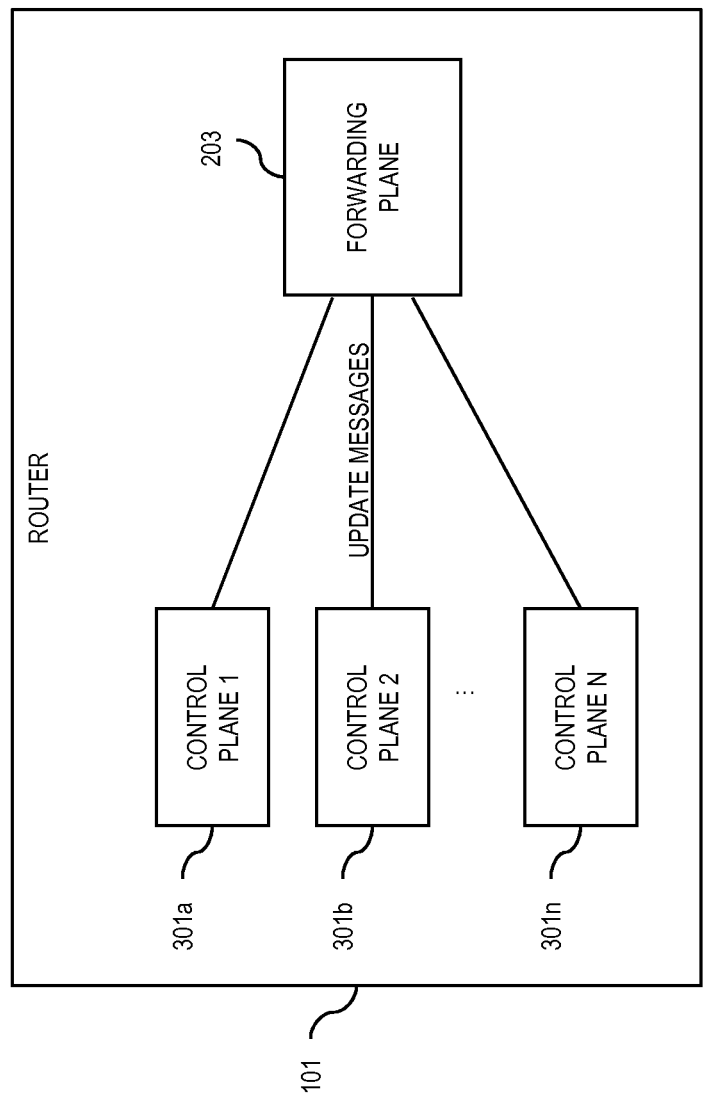
FIG. 3 is a diagram of a router including multiple control planes utilizing a common forwarding plane, according to an exemplary embodiment.

FIG. 3 is a diagram of a router 101 including multiple control planes 301a, 301b, . . . 301n, utilizing a common forwarding plane 203, according to an exemplary embodiment. For the purposes of illustration, the logical routers 105a-105n are described in a Traffic-Engineered (TE) Multiprotocol Label Switching (MPLS) environment. As described, the router 101 includes forwarding plane hardware 203 that is shared by two or more logical routing entities, i.e., logical routers 105a-105n. Traditionally, routers utilize a single control-plane entity and a single forwarding plane entity. In order to avoid the use of multiple, often underutilized physical routers to perform differing routing functions or services, a N:1 relationship is established among control plane entities 301a-301n and the forwarding plane 203. This arrangement allows a single routing platform to appear as multiple logical routing platforms to the network 100. Consequently, the sharing of a single hardware platform among several routing functions or services can be achieved. The approach of router 101 involves an advertised bandwidth update message exchange between the forwarding plane 203 and the control planes 301a-301n. In one embodiment, the mechanism for exchanging such capacity information is locally implemented, thereby requiring no protocol exchange between the logical routers 105a-105n.

It is recognized that interior gateway protocols, such as Open Shortest Path First (OSPF) and Intermediate System to Intermediate System (IS-IS), have been extended to support the distribution of Traffic Engineering information so that appropriate Traffic-Engineered Label Switched Paths (LSPs) can be calculated and signaled across an MPLS network. These extensions are specified in Internet Engineering Task Force (IETF) Request for Comment (RFC) 3630 and RFC 3784, for OSPF and IS-IS, respectively, which are incorporated herein by reference in their entireties. In these RFCs, Sub-TLVs (Type-Length-Values) have been defined to identify the link in question, color or administrative group of the link, the link's Maximum Bandwidth, the link's (Maximum) Reservable Bandwidth, the link's Unreserved Bandwidth and the link's TE-metric or cost.

This information can be distributed throughout the network for all links so that each router in the network is aware of the entire topology of the network. As LSPs are signaled using this information and bandwidth is reserved, the routers in the LSP path update the Unreserved Bandwidth (UnRsvBW) value and send this updated information out to the other routers in the network. Accordingly, any ingress label switch router can determine where to place future LSPs based on lowest metric cost and bandwidth availability.

Conventional implementations of traffic engineering in a multiple logical router environment operate in a "ships-in-the-night" mode. As such, the above process occurs without regard to any other logical routers using the same port. Assuming router 101 is configured to operate in this conventional mode of operation, Logical Router 1 would reserve a certain amount of bandwidth, "X", on a logical or physical port. In this scenario, the rest of the LR1 network would be aware of the bandwidth change because of the UnRsvBW Sub-TLV field, but no other LRs (e.g., LR2 . . . LRN) on the same physical platform would be notified of the bandwidth reservation (much less the other routers in the non-LR1 network). As a result, the other networks may consider this link as a viable candidate for LSP placement even though it now has an available bandwidth that is less (i.e., MaxBW−X). Hence, a mechanism is needed to alert all the local LRs that are sharing a port that the advertised capacity has now changed, so that these LRs can update their Traffic Engineering Databases (TED) and router neighbors.

The system 100, according to certain embodiments, provides real-time modification of oversubscription factors to achieve network goals of high utilization with low loss. It is noted that oversubscription and CAC can happen at multiple different layers; and these processes described herein can apply to any of those layers. For example, in an MPLS network, LSPs are assigned to physical interfaces and pseudowires (PWs) are assigned to LSPs. In an exemplary embodiment, oversubscription of physical interfaces means that the aggregate of LSP bandwidths across an interface exceeds the physical bandwidth of the interfaces. Also, oversubscription of LSPs provides that the aggregate of the PW bandwidths across an LSP exceeds the bandwidth signaled by the LSP. Using the case of interface oversubscription of LSP bandwidths as a baseline, there are two network problems addressed by the processes described herein.

The first major issue addressed is that of forwarding plane utilization not equaling control plane bandwidth defined by CAC. For example, in the case of a 10 G interface oversubscribed by a ratio of 2:1, the control plane will allow twenty 1 G LSPs to be signaled across the interface. The network operator may expect that, on average, the utilization of each 1 G LSP will be about 500M (i.e., 1 G/oversubscription factor). However, the actual utilization of the LSP could be in a first case 250M or it could be in a second case 1 G. In the first case, if all LSPs behave in a similar fashion, then after twenty LSPs are signaled, then the interface will only be 50% full, but no more LSPs will be allowed until the oversubscription factor is manually changed on the interface because the control plane traditionally has no knowledge of forwarding plane utilization. In the second case, if all LSPs consume 1 G, then after ten LSPs, all LSPs will start experiencing packet loss and latency until the oversubscription factor is manually changed on the interface. On a large network, monitoring interface utilization and making such changes is likely to require an extensive period of time (e.g., days), if it is ever even performed.

The second major issue addressed is that of multiple control planes reserving bandwidth on a single physical interface independently without knowledge of the other control planes in a ships-in-the-night routing architecture. In this case, even if the forwarding plane utilization of flows signaled by one control plane are consistent with the signaled bandwidth, the total forwarding plane utilization of flows signaled by all control planes cannot be controlled well. In the example above, if two control planes each signal ten 1 G LSPs across an interface, each control plane would see the interface as being only 50% full, even though there is no bandwidth remaining on the interface. If the oversubscription of both networks is reduced to accommodate for this issue, then bandwidth will be wasted if the networks do not consume the same proportions of bandwidth across all network interfaces. For example, if each network is set to only signal 10 G of LSPs across the interface, and one network has no LSPs traversing the interface, then the other network will think the interface is full even though half of the interface bandwidth is still available. As before, traditionally such a problem can only be corrected by manually making changes to each interface in the network, which is not operationally efficient.

Both of the above problems result from the same basic problem, namely, that the forwarding plane utilization and the control plane bandwidth defined by CAC are not consistent. The system 100, according to certain embodiments, solves these problems by taking measurements of forwarding plane utilization on an interface, and updating the control plane oversubscription bandwidths for that interface based on the differences between measured and expected behavior.

Figure 4:
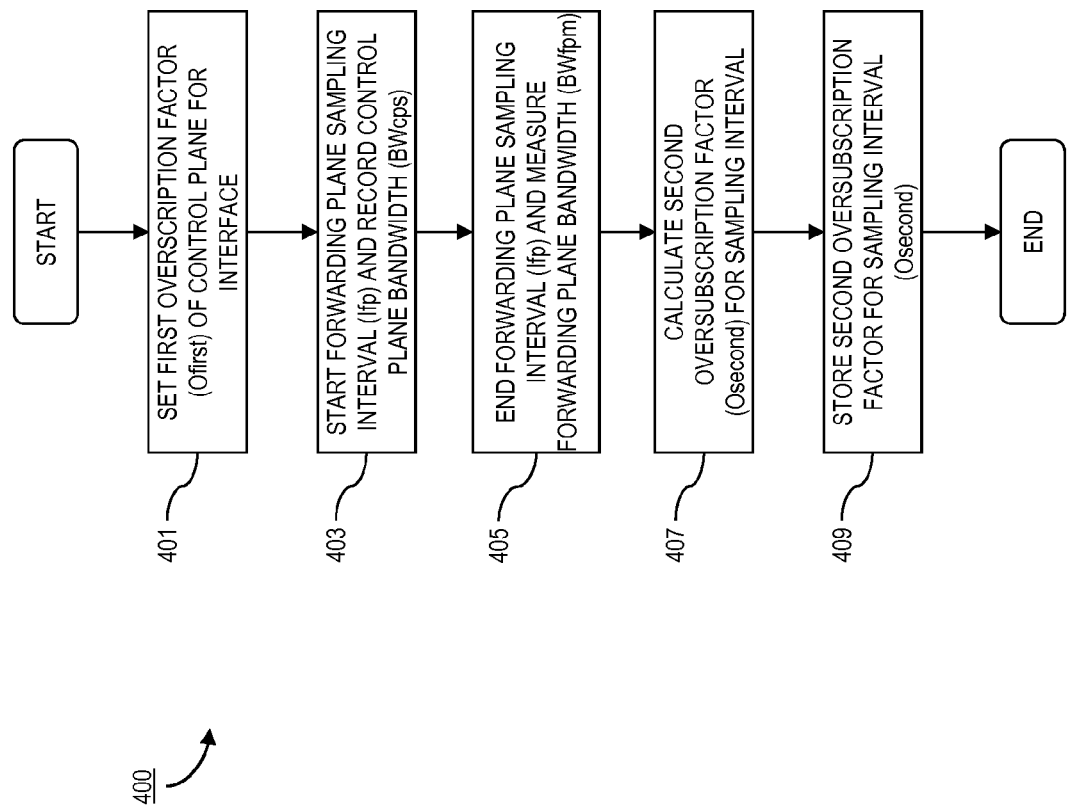
FIG. 4 is a flowchart of a process for sampling forwarding plane utilization and calculating an oversubscription factor of a control plane based on the sampled forwarding plane utilization and a target forwarding plane utilization, according to an exemplary embodiment.

FIG. 4 is a flowchart of a process 400 for sampling forwarding plane utilization and calculating an oversubscription factor of a control plane based on the sampled forwarding plane utilization and a target forwarding plane utilization, according to an exemplary embodiment. The process 400 generally occurs during a predetermined sampling interval, which can be set to any desired frequency, and can be repeated for as long as desired.

In step 401, a first oversubscription factor (Ofirst) of the control plane is set for the interface. At the initiation of the process 400, the first over subscription value (which can be considered an initial oversubscription value (Oi) at the initiation of the first iteration of the processes described herein) can be set based on an estimation of the utilization, or can be set based on a baseline of historical data regarding previous utilization. In step 403, a forwarding plane sampling interval (Ifp) is started, and a control plane bandwidth (BWcps) is recorded or sampled at the start of the forwarding plane sampling interval. This process can use any methods of measuring forwarding plane utilization, for example, using existing network hardware to varying degrees of accuracy and measurement duration, or using other methods. In step 405, the forwarding plane sampling interval is ended, and a forwarding plane bandwidth (BWfpm) is measured.

In step 407, a second oversubscription factor (Osecond) for the sampling interval is calculated. The control plane oversubscription bandwidths for the interface can be determined based on the differences between measured and expected behavior using the following relationship:

$$[BWcps/(O \times BWi)] \times Ufpt = BWfpm/Bwi,$$

where BWcps is the control plane bandwidth signaled in Gbps; O is the oversubscription factor; BWi is the interface bandwidth in Gbps; Ufpt is the target forwarding plane utilization; and BWfpm is the measured forwarding plane bandwidth in Gbps.

In the above relationship, BWi is fixed, Ufpt is manually configured, and BWcps varies over time as the control plane completes CAC functions. Accordingly, for any given BWcps, as BWfpm changes, O has to change to keep the equation valid. Therefore, the second oversubscription factor can be calculated using the following equation:

$$Onew = BWcps \times Ufpt/BWfpm,$$

as long as certain conditions are met, which can be used to control the behavior of the oversubscription updates. Such conditions will be discussed below with respect to FIGS. 5A and 5B. Thus, in step 409, the calculated second oversubscription factor is stored for subsequent analysis to determine if such conditions are met.

The behavior of the oversubscription updates can be controlled, for example, by controlling the forwarding plane bandwidth sampling interval (Ifp), the measurement interval required to increase O (Ii), and the measurement interval required to decrease O (Id). At the beginning of each Ifp, BWcps would be recorded (as in step 403), and at the end of each Ifp, BWfpm would be measured (as in step 405), and Osecond would be calculated (as in step 407). If Osecond is greater then Ofirst during every sample during interval Ii (e.g., as discussed below with regard to FIG. 5A), then BWcps and BWfpm samples can be averaged together across the interval and the averages can be used to calculate the Osecond applied to the interface subject to certain restrictions (e.g., as discussed below with regard to FIG. 5B). Likewise, if Osecond is less than Ofirst during every sample during interval Id (e.g., as discussed below with regard to FIG. 5A), then the same would occur (e.g., as discussed below with regard to FIG. 5B). If during interval Ii any sample Osecond is less than Ofirst, then a new interval Id is started (e.g., as discussed below with regard to FIG. 5A). Likewise, if during interval Id, any sample Osecond is greater than Ofirst, then a new interval is started (e.g., as discussed below with regard to FIG. 5B). Having different interval for Ii and Id allows the network to quickly reduce O in the event of congestion, while increasing the O only if BWfpm is low for extended periods of time.

FIG. 5A is a flowchart of a process 500 for determining whether a change in the oversubscription factor over an oversubscription decrease interval or over an oversubscription factor increase interval warrants consideration for an update in the oversubscription factor, according to an exemplary embodiment. The steps provided in FIG. 5A are optional, but can be used to reduce the number of times the oversubscription factor is updated in order to avoid overburdening the routers with numerous updates. Also, the inclusion of both a decrease interval and an increase interval in the process in FIG. 5A allows for differentiation between the number of updates during periods of increase versus during periods of decrease, for example, to allow for relatively quick upward adjustments and slower downward adjustments, or vice versa.

In step 501, an Osecond value is collected for analysis, for example, for each forwarding plane bandwidth sampling interval (Ifp). In step 503, it is determined whether Osecond is greater than Ofirst. If Osecond is not greater than Ofirst, then the process proceeds to step 504 where it is determined whether Osecond is less than Ofirst. If in step 504 it is determined that Osecond is not less than Ofirst (i.e., that Osecond equals Ofirst), then the process 500 simply restarts. If, however, Osecond is less than Ofirst, then an oversubscription decrease interval (Id) is started in step 505. Then, during the decrease interval (Id), one or more additional Osecond value(s) are collected, such as in step 507, and it is determined in step 509 whether the additional Osecond value is greater than the Ofirst value. If the additional Osecond value is greater than the Ofirst value, then the process proceeds to step 515 where an oversubscription factor increase interval (Ii) is started. However, if the additional Osecond value is not greater than the Ofirst value in step 509, then it is determined whether the decrease interval (Id) has expired in step 511. If the decrease interval (Id) has not yet expired, then the process loops back to step 507 and another additional Osecond value is collected and analyzed. If, however, the decrease interval (Id) has expired in step 511, then the oversubscription update information is stored in step 513 and the process then proceeds to the process in FIG. 5B.

If, in step 503, Osecond is determined to be greater than Ofirst, then the process proceeds to step 515, where an oversubscription increase interval (Ii) is started. Then, during the increase interval (Ii), one or more additional Osecond value(s) are collected, such as in step 517, and it is determined in step 519 whether the additional Osecond value is less than the Ofirst value. If the additional Osecond value is less than the Ofirst value, then the process proceeds to step 505 where an oversubscription factor decrease interval (Id) is started. However, if the additional Osecond value is not less than the Ofirst value in step 519, then it is determined whether the increase interval (Ii) has expired in step 521. If the increase interval (Ii) has not yet expired, then the process loops back to step 517 and another additional Osecond value is collected and analyzed. If, however, the increase interval (Ii) has expired in step 521, then the oversubscription update information is stored in step 513 and the process then proceeds to the process in FIG. 5B.

Figure 5B:
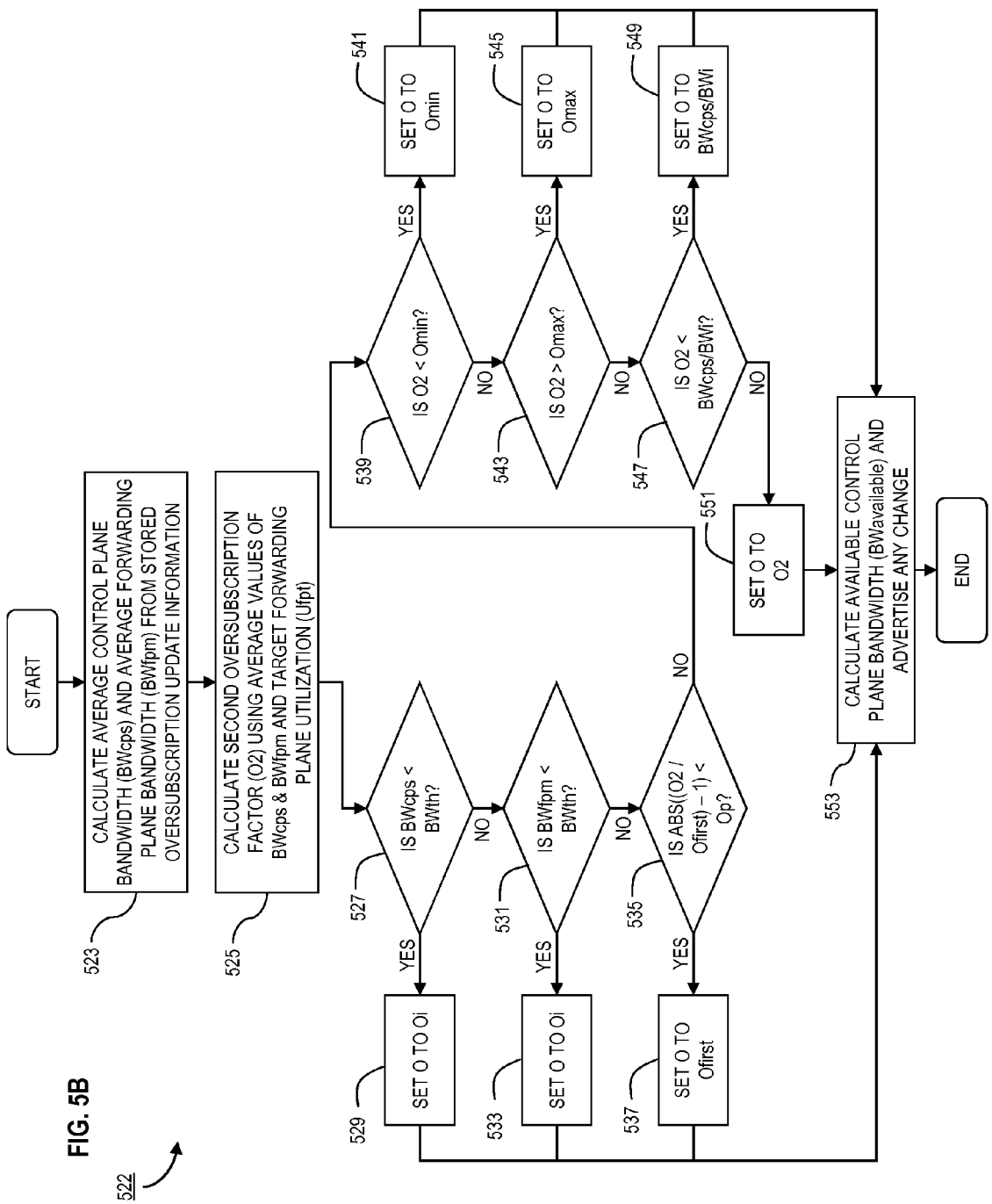
FIG. 5B is a flowchart of a process for changing an advertised bandwidth of the control plane based upon updating of the oversubscription factor to the new oversubscription factor, according to an exemplary embodiment.

In addition to the controls on the behavior of the oversubscription updates discussed, above, the oversubscription value can be controlled and managed by setting an initial value (Oi), a min value (Omin), a max value (Omax), and a minimum percentage change (Op). For a given BWcps, as BWfpm increases, O can be increased to compensate for the higher than expected BWfpm, regardless of whether the extra BWfpm came from higher than expected traffic from each CAC defined flow in one control plane, or additional CAC defined flows by another control plane signaling traffic across the same interface. BWcps and BWfpm can be controlled to be greater than a predetermined threshold amount (BWth) to prevent skewing the results. If the new calculated value of O is within +/− Op percent of the current O, then no change would occur. If the new calculated O was greater than Omax, then O can be set to Omax. If the new calculated value of O was less then Omin, then O can be set to Omin. In addition, O can be bound by the current BWcps, such that BWcps does not exceed total bandwidth available. In other words, this algorithm would preferably not be used to force existing CAC defined flows to move away from the interface because this would result in too much network churn, but rather it would only be used to affect the placement of new flows. FIG. 5B sets forth an embodiment of such controls.

FIG. 5B is a flowchart of a process 522 for changing an advertised bandwidth of the control plane based upon updating of the oversubscription factor to the new oversubscription factor, according to an exemplary embodiment. In step 523, the oversubscription update information stored in step 513 at either the expiration of the decrease interval (Id) or the increase interval (Ii) would be collected, and an average value of the control plane bandwidth (BWcps) and an average value of the forwarding place bandwidth (BWfpm) are calculated. In step 525, a second oversubscription value for the interval (O2) is calculated using the average value of the control plane bandwidth (BWcps), the average value of the forwarding place bandwidth (BWfpm), and the target forwarding plane utilization (Ufpt) in the above equation. With this information, numerous controls are evaluated in order to determine an updated oversubscription factor.

In step 527, it is determined whether the average value of the control plane bandwidth (BWcps) is less than a predetermined threshold bandwidth (BWth). If the average value of the control plane bandwidth (BWcps) is less than the predetermined threshold bandwidth (BWth), then the new oversubscription value (O) is set to the initial oversubscription value (Oi) in step 529 and the process proceeds to step 553. If the average value of the control plane bandwidth (BWcps) is not less than the predetermined threshold bandwidth (BWth), then it is determined whether the average value of the forwarding plane bandwidth (BWfpm) is less than the predetermined threshold bandwidth (BWth) in step 531. If the average value of the forwarding plane bandwidth (BWfpm) is less than the predetermined threshold bandwidth (BWth), then the new oversubscription value (O) is set to the initial oversubscription value (Oi) in step 533 and the process proceeds to step 553. If the average value of the forwarding plane bandwidth (BWfpm) is not less than the predetermined threshold bandwidth (BWth), then the process proceeds to step 535.

In step 535, it is determined whether absolute value of ((O2/Ofirst)−1) is less than the minimum percentage change (Op), and, if so, then the new oversubscription value (O) is set to Ofirst in step 537 and the process proceeds to step 553. If, however, it is determined that the absolute value of ((O2/Ofirst) −1) is not less than the minimum percentage change (Op), then the process proceeds to step 539. In step 539, it is determined whether O2 is less than Omin, and, if so, then the oversubscription value (O) is set to Omin in step 541 and the process proceeds to step 553. If, however, O2 is not less than Omin, then the process proceeds to step 543. In step 543, it is determined whether O2 is greater than Omax, and, if so, then the oversubscription value (O) is set to Omax in step 545 and the process proceeds to step 553. If, however, O2 is not greater than Omax then the process proceeds to step 547. In step 547, it is determined whether O2 is less than the average value of the control plane bandwidth (BWcps) divided by the interface bandwidth (BWi), and, if so, then the oversubscription value (O) is set to the average value of the control plane bandwidth (BWcps) divided by the interface bandwidth (BWi) in step 549 and the process proceeds to step 553. If, however, O2 is not less than the average value of the control plane bandwidth (BWcps) divided by the interface bandwidth (BWi), then the oversubscription value (O) is set to O2 in step 551, and the process proceeds to step 553.

In step 553, the oversubscription value determined at one of steps 529, 533, 537, 541, 545, 549, or 551 is used to calculate the available control plane bandwidth (BW available), which is advertised if a change has occurred. Thus, the measurements taken of the forwarding plane utilization on an interface can be used to update the advertised control plane oversubscription bandwidths for that interface based on the differences between measured and expected behavior.

A first example of the above processes is set forth below. In this example, twenty 1 G LSPs are signaled across a 10 G interface that is oversubscribed by a ratio of 2:1, and each LSP has 250M of traffic. In this example, BWcps is equal to 20 G; Oi is set at 2; Omin is set at 0.5; Omax is set at 4; BWi is 10 G; Ufpt is set at 0.9; and BWfpm is equal to 5 G. Using traditional methods, the interface would be at 50% utilization (BWfpm/BWi), yet the control plane would believe that the interface is fully utilized and will not allow any more LSPs to be signaled. However, applying the formula set forth above and the processes described herein, O2=20 G×0.9/5 G=3.6, which is less than Omax. This would increase available control plane bandwidth for new LSPs to 16 G (i.e., (BWi×O−BWcps)=(10×3.6−20)=16 G). If five more 1 G LSPs were signaled, and all twenty-five LSPs had 500 Mbps of traffic, then O2 would be reduced as follows: O2=25 G×0.9/12.5 G=1.8, but since this is less than 2.5 (i.e., BWcps/BWi=25/10=2.5), then O is set to 2.5 (see, steps 547 and 549). If BWcps decreased any or BWfpm decreased significantly, then O would change again to compensate.

In a second example, the following two ships-in-the-night networks are running across the same physical interface. In Network 1, BWcps=5 G (carrying target amount of traffic BWcps/Oi=1 G); Oi=5; Omin=0.5; Omax=10; and Ufpt=0.9. In Network 2, BWcps=30 G (carrying target amount of traffic BWcps/Oi=1 G); Oi=30; Omin=0.5; Omax=60; and Ufpt=0.9. The two networks are riding across the same interface, so they will have the same forwarding plane measurements: BWi=10 G; and BWfpm=2 G. In this scenario, O2 (Network 1)=5 G×0.9/2 G=2.25; and O2 (Network2)=30 G×0.9/2 G=13.5. The result is that Network 1 reduces available bandwidth for new LSPs from 45 G to 17.5 G, while Network 2 reduces available bandwidth from 270 G to 105 G. If Network 2 sees LSP utilization triple, then both networks will compensate for it: BWi=10 G; and BWfpm=4 G. Thus, O2 (Network 1)=5 G×0.9/4 G=1.125; and O2 (Network 2)=30 G×0.9/4 G=6.75. The result is that Network 1 reduces available bandwidth for new LSPs from 17.5 G to 6.125 G, while Network 2 reduces available bandwidth from 105 G to 37.5 G.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 6 illustrates computing hardware (e.g., computer system) upon which an embodiment according to the invention can be implemented. The computer system 600 includes a bus 601 or other communication mechanism for communicating information and a processor 603 coupled to the bus 601 for processing information. The computer system 600 also includes main memory 605, such as random access memory (RAM) or other dynamic storage device, coupled to the bus 601 for storing information and instructions to be executed by the processor 603. Main memory 605 also can be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
sampling forwarding plane utilization associated with a control plane of an interface of a router;
changing an advertised bandwidth of the control plane based upon updating of an oversubscription factor for the interface to a new oversubscription factor; and
determining a decrease interval and an increase interval to regulate frequency of the updating of the oversubscription factor.

2. A method of claim 1, wherein the control plane is among a plurality of control planes, the method further comprising:
processing, via a forwarding plane, a plurality of packets, wherein the forwarding plane is common to the plurality of control planes.

3. A method of claim 2, wherein the packets are received from a multiprotocol label switching network.

4. A method of claim 1, wherein the new oversubscription factor is either equal to a predetermined minimum oversubscription factor when the second oversubscription factor is less than the predetermined minimum oversubscription factor or equal to a predetermined maximum oversubscription factor when the second oversubscription factor is greater than the predetermined maximum oversubscription factor.

5. A method of claim 1, wherein the new oversubscription factor is equal to an initial oversubscription factor that is set based upon historical data of the control plane for the interface either when a signaled bandwidth of the control plane for the interface is less than a predetermined threshold bandwidth or when a measured bandwidth of the forwarding plane is less than a predetermined threshold bandwidth.

6. A method of claim 1, wherein the new oversubscription factor is equal to an initial oversubscription factor that is set based upon historical data of the control plane for the interface when a measured bandwidth of the forwarding plane is less than a predetermined threshold bandwidth.

7. A method comprising:
sampling forwarding plane utilization associated with a control plane of an interface of a router; and
changing an advertised bandwidth of the control plane based upon updating of an oversubscription factor for the interface to a new oversubscription factor, wherein the oversubscription factor is a first one of two oversubscription factors, the method further comprising:
determining a second one of the oversubscription factors of the control plane using the sampled forwarding plane utilization.

8. A method of claim 7, further comprising:
updating the first oversubscription factor based upon the determined second oversubscription factor,
wherein the first oversubscription factor is not updated when an absolute value of a percentage change between the first oversubscription factor and the second oversubscription factor is less than a predetermined percentage change value.

9. An apparatus comprising:
at least one processor; and
at least one memory including computer program code for one or more programs,
the at least one memory and the computer program code configured to, with the at least one processor, cause the apparatus to perform at least the following,
sample forwarding plane utilization associated with a control plane of an interface of a router
change an advertised bandwidth of the control plane based upon updating of an oversubscription factor for the interface to a new oversubscription factor, and
determine a decrease interval and an increase interval to regulate frequency of the updating of the oversubscription factor.

10. An apparatus of claim 9, wherein the control plane is among a plurality of control planes, and the apparatus is further caused to:
process, via a forwarding plane, a plurality of packets, wherein the forwarding plane is common to the plurality of control planes.

11. An apparatus of claim 10, wherein the packets are received from a multiprotocol label switching network.

12. An apparatus of claim 9, wherein the new oversubscription factor is either equal to a predetermined minimum oversubscription factor when the second oversubscription factor is less than the predetermined minimum oversubscription factor or equal to a predetermined maximum oversubscription factor when the second oversubscription factor is greater than the predetermined maximum oversubscription factor.

13. An apparatus of claim 9, wherein the new oversubscription factor is equal to an initial oversubscription factor that is set based upon historical data of the control plane for the interface either when a signaled bandwidth of the control plane for the interface is less than a predetermined threshold bandwidth or when a measured bandwidth of the forwarding plane is less than a predetermined threshold bandwidth.

14. An apparatus of claim 9, wherein the new oversubscription factor is equal to an initial oversubscription factor that is set based upon historical data of the control plane for the interface when a measured bandwidth of the forwarding plane is less than a predetermined threshold bandwidth.

15. An apparatus of comprising:
at least one processor; and
at least one memory including computer program code for one or more programs,
the at least one memory and the computer program code configured to, with the at least one processor, cause the apparatus to perform at least the following,
sample forwarding plane utilization associated with a control plane of an interface of a router, and
change an advertised bandwidth of the control plane based upon updating of an oversubscription factor for the interface to a new oversubscription factor,
wherein the oversubscription factor is a first one of two oversubscription factors, and the apparatus is further caused to:
determine a second one of the oversubscription factors of the control plane using the sampled forwarding plane utilization.

16. An apparatus of claim 15, wherein the apparatus is further caused to:
update the first oversubscription factor based upon the determined second oversubscription factor,
wherein the first oversubscription factor is not updated when an absolute value of a percentage change between the first oversubscription factor and the second oversubscription factor is less than a predetermined percentage change value.

17. A system comprising:
a plurality of logical routers; and
a forwarding plane coupled to the logical routers via a messaging bus,
wherein forwarding plane utilization associated with a control plane of one or more of the logical routers is sampled, and an advertised bandwidth of the control plane is changed based upon updating of an oversubscription factor for the interface to a new oversubscription factor, and
wherein the oversubscription factor is a first one of two oversubscription factors, and a second one of the oversubscription factors of the control plane is determined using the sampled forwarding plane utilization.

* * * * *